United States Patent [19]

Tohme

[11] Patent Number: 4,932,742
[45] Date of Patent: Jun. 12, 1990

[54] FIBER OPTIC WAVELENGTH DIVISION MULTIPLEXING MODULE

[75] Inventor: Henri E. Tohme, Roanoke, Va.

[73] Assignee: Alcatel NA, Inc., Hickory, N.C.

[21] Appl. No.: 302,563

[22] Filed: Jan. 27, 1989

[51] Int. Cl.$^5$ .......................... G02B 6/32; G02B 6/26; H04B 9/00; H04J 1/00
[52] U.S. Cl. ............................... 350/96.18; 350/96.16; 350/96.20; 350/96.14; 350/96.15; 350/413; 350/311; 350/316; 370/3; 455/606; 455/610; 455/612; 455/613; 455/617
[58] Field of Search ............... 350/96.15, 96.16, 96.18, 350/96.20, 96.21, 311, 316, 96.13, 96.14, 413, 96.31; 370/3, 1; 250/227; 455/606, 610, 612, 613, 617

[56] References Cited

U.S. PATENT DOCUMENTS

| | | | |
|---|---|---|---|
| 4,213,677 | 7/1980 | Sugimoto et al. | 350/96.18 |
| 4,509,827 | 4/1985 | Cowen et al. | 350/96.18 X |
| 4,550,975 | 11/1985 | Levinson et al. | 350/96.18 |
| 4,733,931 | 3/1988 | Fan | 350/96.18 |
| 4,736,359 | 4/1988 | Cohen et al. | 370/3 |
| 4,834,481 | 5/1989 | Lawson et al. | 350/96.15 |
| 4,844,573 | 7/1989 | Gillham et al. | 350/96.15 |
| 4,873,697 | 10/1989 | Haeussler et al. | 350/96.18 X |

*Primary Examiner*—Brian Healy
*Attorney, Agent, or Firm*—Peter C. Van Der Sluys

[57] ABSTRACT

A light source or detector equipped with an optically transmissive window is coupled to a juxtaposed collimating lens for directing light onto a first side of a dichroic filter which passes or blocks a selected wavelength of light. A second lens in juxtaposition with a second side of the dichroic filter focuses light either passed or reflected by the filter onto an optical fiber for transmission or reception of optical signals. A second optical fiber is connected to the second lens and to a third lens for which conveys light between the second optical fiber and a dichroic filter for passing a different wavelength of light and reflecting the selected wavelength, the filter being in juxtaposition with a window of an optical detector. All components are embedded in a molded enclosure for protecting the optical elements and optical fibers from environmental conditions.

20 Claims, 2 Drawing Sheets

FIBER OPTIC WAVELENGTH DIVISION MULTIPLEXING MODULE

BACKGROUND OF THE INVENTION

1. Field of the Invention

The present invention relates to optical wavelength division multiplexers, and more particularly, to a multiplexer module for use with optical fibers, which is encapsulated in a small but rugged package.

2. Description of the Prior Art

Heretofore fiber optic wavelength division multiplexers were provided as assemblies of discrete components interconnected with optical fibers. FIG. 1 illustrates a typical prior art configuration wherein a wavelength division multiplexer 2 is formed by a dichroic filter 4 disposed between two graded index lenses 6 and 8. The dichroic filter 4 is designed to block and reflect light having a wavelength 11 and to pass light having a wavelength $1_2$. The graded index lenses 6 and 8 are formed with a quarter pitch, so that light received at an outermost surfaces is expanded to illuminate a large area of the dichroic filter 4.

An optical fiber 10 is attached to one end of the graded index lens 6 at a predetermined distance from an axis 12 of the graded index lenses 6 and 8. An optical fiber 14 for transmission purposes is attached to the graded index lens 6 at a point on a side of axis 12 opposite from the point of attachment of optical fiber 10, and at a predetermined distance from the axis equal to the predetermined distance that optical fiber 10 is from axis 12. An optical fiber 16 is attached to graded index lens 8 at a point spaced from axis 12 by a distance equal to the predetermined distance that fiber 10 is spaced from axis 12.

An electro/optical conversion element 18 includes an optical fiber pigtail 20 for connection to an optical fiber and electrical leads 22 for connection to electronic circuitry. Element 18 could be either a light source or a light detector. As a light source, element 18 would comprise either a light-emitting diode or a semiconductor laser. The pigtail 20 is attached to the optical fiber 10 by either fusion splicing, as at 24, or through the use of an optical fiber connector 24. A second electro/optical conversion element 26 may comprise either an optical source or an optical detector, having attached thereto an optical fiber pigtail 28 for connection to an optical fiber, and electronic leads 30 for connection to an electrical system. The optical fiber pigtail 28 is connected to optical fiber 16 either by fusion splicing, as at 32, or through the use of an optical fiber connector 32.

The element 18 is selected to emit or respond to light having a wavelength $1_1$, while the element 26 emits or is responsive to light having a wavelength $1_2$. The optical fiber 14 carries light of both wavelengths $1_1$ and $1_2$, either unidirectionally or bidirectionally.

The fiber optic wavelength division multiplexer assembly shown in FIG. 1 can be adapted to operate either unidirectionally or bidirectionally. In the case of a unidirectional operation, the assembly is designed as either a transmitter or a receiver. As a transmitter, light of both wavelengths $1_1$ and $1_2$ is transmitted on optical fiber 14. In the case of a receiver, light of both wavelengths $1_1$ and $1_2$ is received on optical fiber 14. In the case of a unidirectional transmitter, both elements 18 and 26 are light sources providing light to the optical pigtails 20 and 28. Light of wavelength $1_1$ is injected into the graded index lens 6 by optical fiber 10 at a point a predetermined distance from axis 12. An optical beam 9 is spread by the lens so as to illuminate a large area of the filter 4. Since the filter blocks wavelength $1_1$, the light is reflected as a beam 11 to a point that is the predetermined distance from axis 12, but on a side of the axis opposite from the point at which the light is injected into optical fiber 10. Accordingly, the light enters optical fiber 14 for transmission. In a similar manner, light of wavelength $1_2$ is emitted from source 26 and is injected into lens 8 by optical fiber 16. The light is spread by lens 8 in a beam 13, is passed by filter 4 and is focused by lens 6 onto the end of fiber 14 for transmission on fiber 14.

In the case of a unidirectional receiver, light of both wavelengths is received on optical fiber 14, with the light of wavelength $1_1$ being reflected by filter 4 back to optical fiber 10, which light is received by element 18 which in this case would be an optical detector. Light of wavelength $1_2$ is passed by filter 4, to be ultimately received by element 26, which would also be a detector.

In the bidirectional case, the assembly can be designed to transmit light of one wavelength and receive light of another wavelength, as, for example, element 18 could be a light source for transmitting light through optical fiber 14, which element 26 would be a detector for receiving light received from optical fiber 14, and vice versa.

In most instances the components of the multiplexer shown in FIG. 1 would be disposed within a housing, with only optical fiber 14 and electrical leads 22 and 30 extending therefrom. However, due to fiber connections between the electro/optical conversion elements and the wavelength division multiplexer, these devices were subject to damage by the surrounding environment. The interconnecting fibers were subject to a high risk of breaking or experienced significant increases in attenuation due to flexure and bending caused by the surrounding environment.

The discrete components required considerable space, resulting in an unacceptably large assembly. If the components were placed in a small housing, the fibers ere subjected to small radius bends, resulting in unacceptable losses.

Operationally, the multiplexer was also deficient due to the need for the light to pass through intermediate fibers represented by fibers 10, 16, 20 and 28 shown in FIG. 1. Losses were introduced by coupling the elements 18 and 26 to pigtails 20 and 28, by splicing fibers 10 and 20, and 16 and 28 by coupling fibers 10 and 16 to lenses 6 and 8 respectively, and by being multiplexed inside the wavelength division multiplexer.

Thus, the prior art devices were unacceptably large, experienced considerable power losses, and were subject to a high risk of breaking or being damaged by the surrounding environment.

SUMMARY OF THE INVENTION

The present invention contemplates a fiber optic wavelength division multiplexing module which incorporates the electro/optical conversion elements and a wavelength division multiplexer into a single integrated enclosure. Increased power efficiency is experienced due to a direct connection between an electro/optical conversion element and the wavelength division multiplexer. The need for an intermediate optical fiber connecting one of the electro/optical conversion elements to the wavelength division multiplexer is eliminated, along with the losses caused by the coupling of said intermediate fiber into the system. The requirement for splicing and connectorization is also eliminated, thereby reducing size, cost and a potential failure point.

A lens system is utilized for a coupling and as part of a wavelength division multiplexer. One intermediate fiber is eliminated, and another intermediate fiber is encapsulated in ferrules for protection. The overall package is reduced in size and is rendered more rugged through the elimination of unnecessary fiber and fiber connections, so that the module can withstand more extreme environmental conditions.

A primary objective of the present invention is to provide a more rugged multiplexing module.

Another objective is to provide a less expensive multiplexing module.

Another objective is to provide a multiplexing module that requires less volume than that of the prior art devices.

Another objective is to provide a multiplexing module that experiences less power loss than those of the prior art.

DETAILED DESCRIPTION OF THE PRESENT INVENTION

Figure 1:
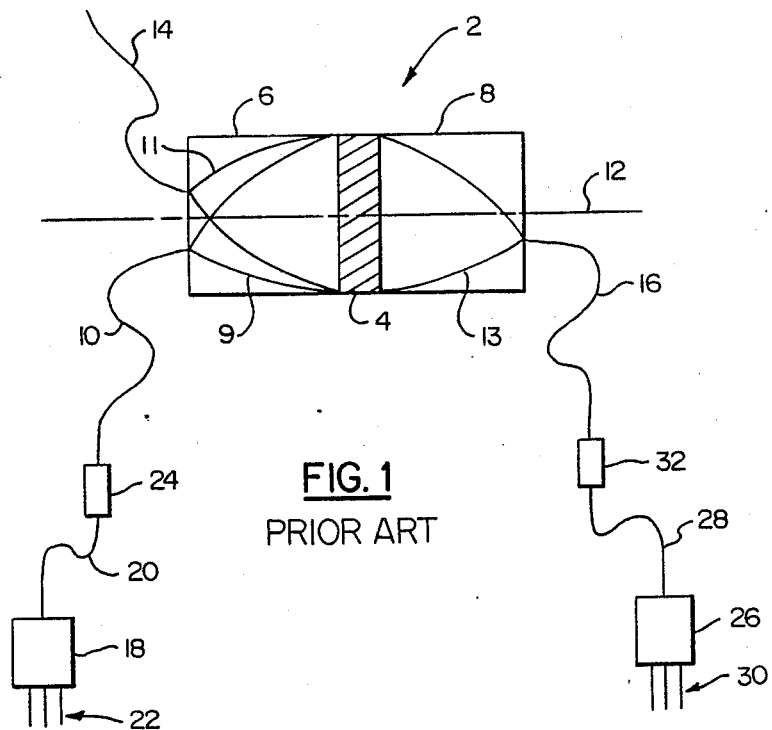
FIG. 1 is a schematic representation of a fiber optic wavelength division multiplexer of the prior art.
Figure 2:
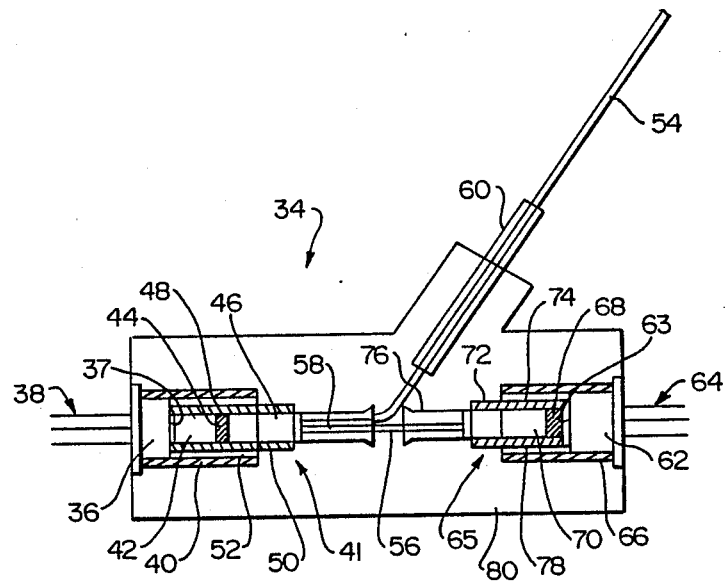
FIG. 2 is a schematic representation of the multiplexing module of the present invention.

Referring to FIG. 2, there is shown a fiber optic wavelength division multiplexing module 34 constructed in accordance with the present invention. The multiplexing module will be described as a multiplexing module for accommodating bidirectional transmission; however, it is to be understood that the module could easily be modified to provide unidirectional transmission and to function either as a transmit module or as a receive module.

An electro/optical conversion element in the form of a light source 36 provides light having a first wavelength $1_1$. The light source may be either a light-emitting diode or a semiconductor laser. In one embodiment the invention, the light source is selected to be a Fujitsu FED086KIWA light source providing a wavelength $1_1$ of 865 nm. The source 36 can be provided in a standard TO package, such as a TO18 or a TO46 package, with a window 37 at its top surface through which the light is emitted. The source 36 includes electrical connecting means 38 for connection to an electronic circuit. A metal sleeve 40 is disposed about the source 36 for protecting a wavelength division multiplexer 41 attached to the light source 36.

Wavelength division multiplexer 41 is formed by a lens 42, a dichroic filter 44 and a second lens 46. The components of the multiplexer are mounted in a metal sleeve 48 using an optically transmissive epoxy 50 to secure the components within sleeve 48. The metal sleeve 48 is positioned on the surface of source 36 so that the multiplexer is aligned with window 37. The sleeve is mounted using an optically transmissive epoxy. A space 52 between metal sleeves 40 and 48 is filled with a slow-hardening epoxy molding compound inserted in the space under low pressure in a separate assembly operation. This low pressure molding operation reduces the possibility of sleeve 48 being dislodged, as would be the case if high pressure molding were used.

The metal sleeve 48 assures proper alignment between the components of the multiplexer and provides for secure attachment of the multiplexer to the light source.

Lens 42 is a collimating lens for light emanating from window 37 of source 36 and may be in the form of a graded index lens or a plano-convex lens, The filter 44 is a 730/865 LWP dichroic filter constructed to pass a wavelength of 865 nm while blocking a wavelength of 730 nm. Such filters are available from Optical Coating Laboratories, Inc., or Microcoatings, Inc. Lens 46 is a graded index lens with a quarter pitch for focusing light transmitted by the dichroic filter 44 onto a point on the outer surface of the lens, at which a transmission fiber 54 is attached to the lens. A second fiber 56 is also attached to lens 46 at a point at which light, having a wavelength of 730 nm, entering lens 46 from fiber 54 and reflected off filter 44 would be focused. The points of contact of fibers 54 and 58 to lens 46 are equally spaced from a center axis of the lens in a manner well-known to those skilled in the art of graded index lenses. Optical fibers 54 and 58 can be either multi-mode or single-mode fibers, depending on the particular application of the multiplexing module. If the fiber is used primarily for receiving light, a large multi-mode fiber would be preferred.

In the described embodiment a multimode fiber having a core of 200 um diameter and a 240 um cladding layer was used.

Fibers 54 and 56 are mounted within a capillary tube or ferrule 58 for securing the fibers in place on the surface of lens 46. The capillary tube or ferrule is useful for both positioning and supporting the optical fibers.

A bend limiting supporting tube 60 is disposed about fiber 54 to limit the radius of the bend of the fiber as it enters capillary 58 and as it exits the housing 80 of the module.

The module includes an electro/optical conversion element in the form of light detector 62 which, in the present embodiment, is designed to receive light having a wavelength of 730 nm, which light is received on fiber 54, expanded by lens 46, reflected by filter 44, focused by lens 46, and conveyed by fiber 56 to the detector 62. Detector 62 may be selected from any one of a number of suitable detectors, which usually have a wavelength sensitivity range of approximately ±150 nm about a selected wavelength. The sensitivity range would be selected so as to be centered about the 730 nm wavelength that is to be detected. Examples of detectors that may be used include the Mitsubishi PD2101 and the Honeywell HFD3002 Detectors. The light detector can be in a standard TO 18 or TO 46 package with a light transmissive window 63. Detector 62 includes electronic connecting means 64 for connection to electronic circuitry.

A metal sleeve 66 is disposed about detector 62 for the purpose of protecting an optical filter 65 mounted to the detector, which optical filter includes a filter 68 and a lens 70. Filter 68 and lens 70 are mounted in a metal sleeve 72 and are secured therein through the use of optically transmissive epoxy 74. The filter 68 is a 730/865 SWP dichroic filter which is adapted to pass light having a wavelength of 730 nm, while blocking light having a wavelength of 865 nm. Lens 70 is connected to optical fiber 56 through the use of a ferrule 76 for supporting and protecting the optical fiber. Lens 70 is a graded index lens with a pitch greater than 0.25 adapted to receive light from the optical fiber 56 and transmit the light to illuminate the dichroic filter 68 and focus the light on the active area of detector 62.

The space 78 between sleeve 66 and sleeve 74 is filled with a slow-hardening epoxy molding which is applied under low pressure, for securing the optical elements in the proper position in regard to window 63 of detector 62.

The entire assembly as described heretofore is totally encapsulated in a molded housing 80 which is formed using a dark epoxy, such as Tra-Cast 3103 provided by Tra-Con, Inc.

The above-described structure eliminates the need for an intermediate optical fiber between the source and the wavelength division multiplexer, and the losses associated with connecting said fiber to the wavelength division multiplexer, and to the fiber pigtail on the source, and the loss between the pigtail connection and the source. The transmission fiber 54 and the interconnecting fiber 56 are securely attached and supported within the molded enclosure to substantially eliminate any chance of breakage or flexure which could result in fatigue and increased attenuation. Thus, the structure provides a more rugged device and reduces losses associated with the many connections required in the prior art devices.

The module depicted in FIG. 2 and thus far described is a bidirectional module wherein a light source 36 is used to provide a light having a wavelength $l_1$ of 865 nm, whereas detector 62 is designed to receive light, including light having a wavelength of $l_2$ of 730 nm. Transmission fiber 54 transmits light having wavelength $l_1$ while receiving light having wavelength $l_2$. Light having a wavelength of $l_1$ is generated in source 36, collimated in lens 42, passed by filter 44 and is focused by filter 46 onto the transmit fiber 54. Light having a wavelength of $l_2$ received from fiber 54 is focused by lens 46 onto filter 44, which blocks the light and reflects it through lens 46 to be focused onto fiber 56, which light is then received by lens 70 and is expanded to illuminate filter 68 which passes light having wavelength $l_2$ to detector 62.

Several other module configurations could be provided by using various combinations of light sources and detectors for the electro/optical conversion elements 36 and 62.

Figure 3A:
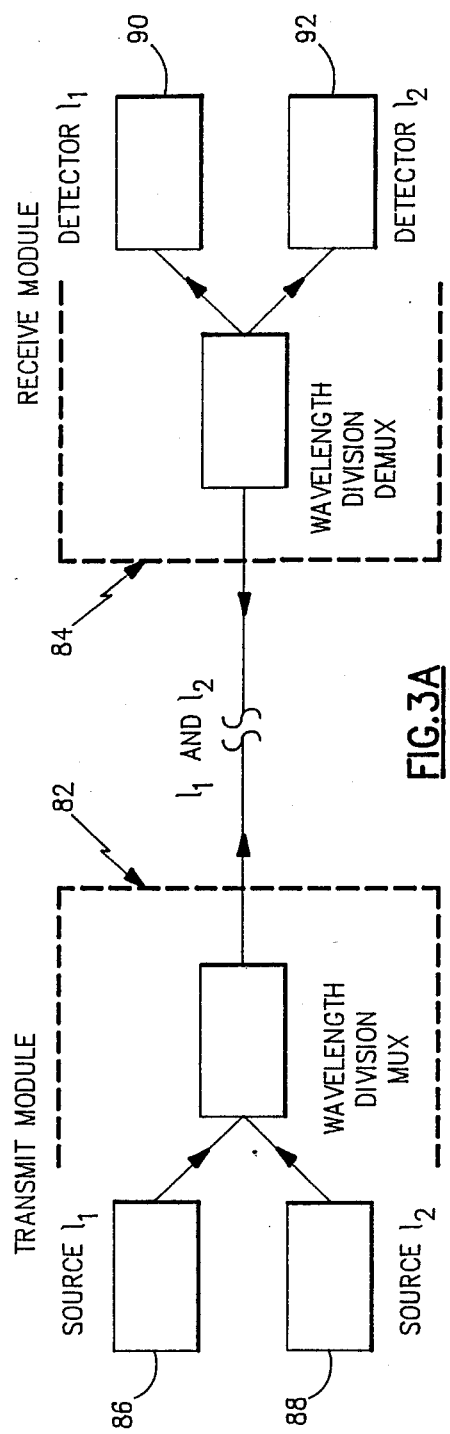
FIGS. 3a and 3b are schematic representations of various configurations of interconnected multiplexing modules.

FIG. 3A illustrates an embodiment wherein the module would be used to provide unidirectional transmission of wavelengths $l_1$ and $l_2$ showing both a transmit module 82 and a receive module 84. In the transmit module 82, two light sources 86 and 88 would be used to provide light of different wavelengths to the wavelength division multiplexer. In such a structure, the light source 36 of FIG. 2 would remain the same, while the detector 62 in FIG. 2 would be changed to a light source similar to that of light source 36, but having a different wavelength. When a light source is used in place of detector 62, the light is focused by lens 70 onto optical fiber 56, and lens 46 expands the light to illuminate filter 44 which reflects the light so that it is again focused by lens 46 onto the transmission fiber 54.

When the multiplexing module is used as a receive module 84, detector 62 remains the same, while light source 36 is changed to a detector element. Light received on transmission fiber 54 having a wavelength $l_1$ is expanded by lens 46 to illuminate filter 44 which passes the light to lens 42, which irradiates the detector replacing light source 36. Detector 92 works in a manner identical to detector 62 shown in FIG. 2.

Figure 3B:
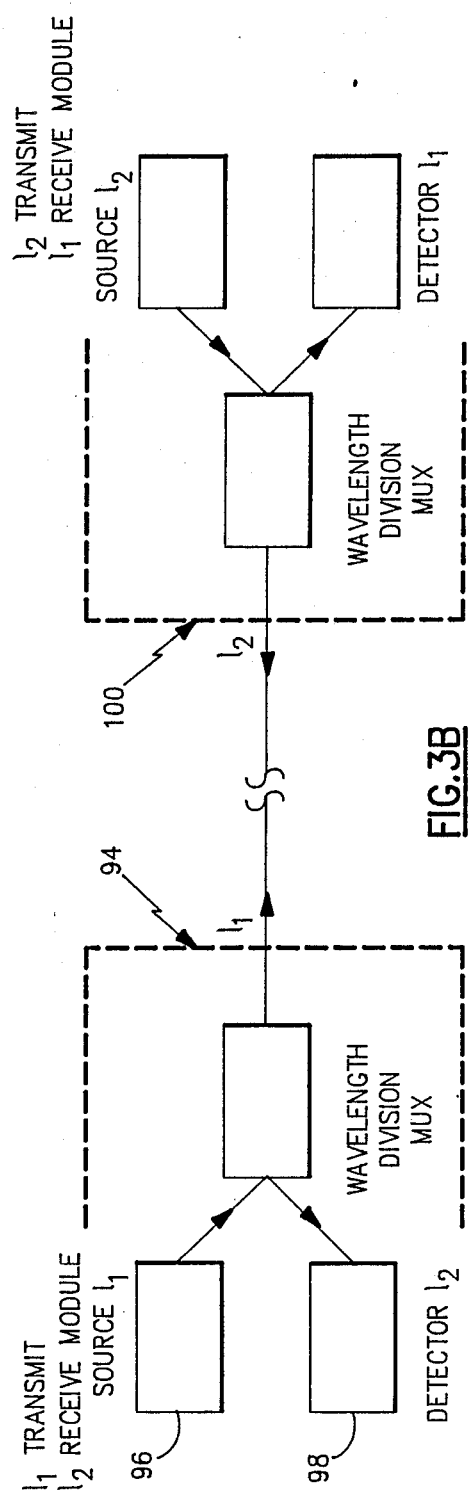

Referring to FIG. 3B, there is described the use of a bidirectional transmission system, wherein a module 94 is constructed identical to that shown in FIG. 2, such that source 96 is identical to light source 36 in FIG. 2, and detector 98 is identical to detector 62 shown in FIG. 2. A transmit receive module 100 can be constructed identically to that of the device shown in FIG. 2, with the exception that the wavelengths of the light source 36 and detector 62 are interchanged, and the filters 44 and 68 are also interchanged in regard to the wavelengths which are passed or reflected.

Thus, the present invention can be constructed in many different embodiments to provide both unidirectional and bidirectional transmission and receiving functions. However, an important aspect of the present invention is that it provides a compact multiplexing module having a smaller size than those of the prior art. The module of the present invention is extremely rugged and is adaptable to many different environmental extremes. Power or light losses associated with prior art multiplexing modules are reduced by eliminating a number of optical fiber connections that were required in the prior art devices.

What is claimed is:

1. A fiber optic wavelength division multiplexing module, comprising:
   first electro/optical conversion means for generating or detecting light having a first wavelength, said conversion means having means for connection to an electrical signal and a window through which said light passes;
   wavelength selective means having first and second ends and an optical path therebetween, for passing light having said first wavelength and reflecting light having a second wavelength, said wavelength selective means being disposed with its first end in juxtaposition with the window of said first electro/optical conversion means;
   second electro/optical conversion means for generating or detecting light having said second wavelength, said conversion means having means for connection to an electrical signal and means for connecting to an optical signal;
   a first optical fiber connecting said second end of said wavelength selective means and said optical signal connecting means of said second electro/optical conversion means for conveying light therebetween; and
   a second optical fiber connected to said second end of said wavelength selective means for conveying light to and from said wavelength selective means, whereby light having said first wavelength passes through the wavelength selective means and is conveyed between said first electro/optical conversion means and said second optical fiber and light having said second wavelength is reflected by said wavelength selective means so that it is connected between said second electro/optical conversion means and said second optical fiber.

2. A fiber optic wavelength division multiplexing module, as described in claim 1, wherein the first and second electro/optical conversion means are light sources.

3. A fiber optic wavelength division multiplexing module, as described in claim 1, wherein the first and second electro/optical conversion means are light detectors.

4. A fiber optic wavelength division multiplexing module, as described in claim 1, wherein the first electro/optical conversion means comprises a light source and said second electro/optical conversion means comprises a light detector.

5. A fiber optic wavelength division multiplexing module, as described in claim 1, wherein the first electro/optical conversion means comprises a light detector and said second electro/optical conversion means comprises a light source.

6. A fiber optic wavelength division multiplexing module, as described in claim 1, wherein said wavelength selective means comprises:

a first lens having first and second ends with one end forming the first end of the wavelength selective means and being in juxtaposition with said window, said first lens functioning as a collimating lens for light coming from said window;

a quarter pitch graded index lens having first and second ends, with one end forming the second end of the wavelength selective means and connected to said optical fibers; and a dicroic filter disposed between the other ends of said first lens and said quarter pitch graded index lens, said dichroic filter having characteristics such that it passes light having said first wavelength and reflects light having said second wavelength.

7. A fiber optic wavelength division multiplexing module, as described in claim 6, wherein said first lens, said quarter pitch graded index lens and said dichroic filter are disposed within a first cylindrical sleeve.

8. A fiber optic wavelength division multiplexing module, as described in claim 7, wherein said first lens, quarter pitch graded index lens and dichroic filter are secured within the first cylindrical sleeve and to said first electro/optical conversion means with optically transmissive epoxy.

9. A fiber optic wavelength division multiplexing module, as described in claim 7, wherein said first electro/optical conversion means is disposed in a cylindrical housing and said module additionally comprises a second cylindrical sleeve disposed about said housing and extending around said first cylindrical sleeve.

10. A fiber optic wavelength division multiplexing module, as described in claim 1, additionally comprising a molded enclosure enclosing said first and second electro/optical conversion means, said wavelength selective means and said first optical fiber and having extending therefrom said second optical fiber and said means for connecting to an electrical signal of both said first and second electro/optical conversion means.

11. A fiber optic wavelength division multiplexing module, as described in claim 1, additionally comprising tubular means attached to said second end of the wavelength selective means and having disposed therethrough said first and second optical fibers.

12. A fiber optic wavelength division multiplexing module, as described in claim 10, addtionally comprising means partially enclosed in said enclosure and disposed about said second optical fiber for limiting the bending of said second optical fiber.

13. A fiber optic wavelength division multiplexing module, as described in claim 1, wherein the means for connecting to an optical signal of said second electro/optical conversion means comprises a window through which said light passes and a graded index lens for conveying and focusing light between said first optical fiber and said window.

14. A fiber optic wavelength division multiplexing module, as described in claim 13, additionally comprising a dichroic filter disposed between the window of the second electro/optical conversion means and the graded index lens of the second electro/optical conversion means, said dichroic filter being adapted to pass light having said second wavelength and reflecting light having said first wavelength.

15. A fiber optic wavelength division multiplexing module, as described in claim 14, wherein said graded index lens and dichroic filter of the second electro/optical conversion means is disposed within a cylindrical sleeve.

16. A fiber optic wavelength division multiplexing module, as described in claim 15, wherein the dichroic filter and graded index lens of the second electro/optical conversion means is secured within the cylindrical sleeve with an optically transmissive epoxy.

17. A fiber optic wavelength division multiplexing module, as described in claim 15, wherein said second electro/optical conversion means is disposed in a cylindrical housing and additionally includes a cylindrical sleeve disposed about said housing and extending about the cylindrical sleeve disposed about the dichroic filter and graded index lens of the second electro/optical conversion means.

18. A fiber optic wavelength division multiplexing module, as described in claim 17, additionally comprising a tubular means formed about said first optical fiber and connected to the graded index lens of said second electro/optical conversion means.

19. A fiber optic wavelength division multiplexing module, as described in claim 18, additionally comprising a molded enclosure enclosing said first and second electro/optical conversion means, said wavelength selective means and said first optical fiber and having extending therefrom said second optical fiber and said means for connecting to an electrical signal of both said first and second electro/optical conversion means.

20. A fiber optic wavelength division multiplexing module, as described in claim 19, additionally comprising means partially enclosed in said enclosure and disposed about said second optical fiber for limiting the bending of said second optical fiber.

* * * * *